United States Patent
Gao

(10) Patent No.: US 9,258,847 B2
(45) Date of Patent: Feb. 9, 2016

(54) METHOD FOR TRANSMITTING COORDINATED MULTIPOINT TRANSMISSION/RECEPTION COORDINATED GROUP MESSAGES AND AN EVOLVED NODEB THEREOF

(75) Inventor: Yin Gao, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 93 days.

(21) Appl. No.: 13/258,990

(22) PCT Filed: Dec. 28, 2009

(86) PCT No.: PCT/CN2009/076135
§ 371 (c)(1),
(2), (4) Date: Oct. 11, 2011

(87) PCT Pub. No.: WO2010/121480
PCT Pub. Date: Oct. 28, 2010

(65) Prior Publication Data
US 2012/0127908 A1    May 24, 2012

(30) Foreign Application Priority Data
Apr. 22, 2009   (CN) .......................... 2009 1 0137312

(51) Int. Cl.
*H04W 92/20* (2009.01)
*H04W 72/04* (2009.01)
(Continued)

(52) U.S. Cl.
CPC ............ *H04W 92/20* (2013.01); *H04W 72/042* (2013.01); *H04W 28/16* (2013.01); *H04W 36/0083* (2013.01)

(58) Field of Classification Search
CPC ... H04L 5/0035; H04L 5/0023; H04L 5/0048; H04L 5/0053; H04W 72/042; H04W 24/10; H04W 72/0406; H04W 24/02; H04W 72/04; H04W 72/085; H04W 72/082; H04W 72/0413; H04W 72/0426; H04J 11/0053

USPC ......... 370/312, 328, 331, 329, 252, 336, 330; 375/267
See application file for complete search history.

(56) References Cited

U.S. PATENT DOCUMENTS

| | | | |
|---|---|---|---|
| 2010/0027471 A1* | 2/2010 | Palanki et al. | 370/328 |
| 2010/0067604 A1* | 3/2010 | Bhadra et al. | 375/267 |

(Continued)

FOREIGN PATENT DOCUMENTS

| | | |
|---|---|---|
| CN | 101335539 A | 12/2008 |
| CN | 101373998 A | 2/2009 |

(Continued)

OTHER PUBLICATIONS

3GPP TS 36.423 V8.5.0, "X2 application protocol (X2AP), (Release 8)", Mar. 2009.*

(Continued)

*Primary Examiner* — Un C Cho
*Assistant Examiner* — Oussama Roudani
(74) *Attorney, Agent, or Firm* — Brooks Kushman P.C.

(57) ABSTRACT

A method for transmitting Coordinated Multipoint transmission/reception (CoMP) coordinated group information and an Evolved NodeB (eNB) thereof are provided in the present invention. The method includes: the eNB sends the CoMP coordinated group information of the CoMP coordinated group to which the local service cell belongs, and/or the CoMP coordinated group information of the CoMP coordinated group to which the neighboring cell of the local service cell belongs to other eNBs via the X2 interface message. The eNB is configured with an X2 interface unit and a storage unit. The present invention can improve the CoMP transmission handover success rate of the network and improve the network performance.

4 Claims, 3 Drawing Sheets

(51) Int. Cl.
  *H04W 28/16* (2009.01)
  *H04W 36/00* (2009.01)

(56) References Cited

U.S. PATENT DOCUMENTS

2010/0177746 A1* 7/2010 Gorokhov et al. ............ 370/336
2013/0142068 A1* 6/2013 Marinier et al. .............. 370/252

FOREIGN PATENT DOCUMENTS

CN 101610537 A 12/2009
WO 2008099340 8/2008

OTHER PUBLICATIONS

International Search Report for PCT/CN2009/076135 English translation attached to original, Both completed by the Chinese Patent Office on Mar. 15, 2010, All together 4 Pages.

Extended European Search Report for European Application No. 09843584.5, Completed by the European Patent Office, Dated Dec. 16, 2014, 11 Pages.

Nortel, 3GPP TSG-RAN Working Group 1 Meeting No. 55b Jan. 12-Jan. 16, 2009, 4 Pages, "Clustering for CoMP Transmission."

Nokia Siemens Networks, Nokia 3GPP TSG-RAN WG1 Meeting No. 56 Feb. 9-Feb. 13, 2009, 4 Pages, "Setup for CoMP cooperation areas."

LG Electronics, 3GPP TSG RAN WG1 Meeting No. 56b Mar. 23-Mar. 27, 2009, 4 Pages, "Cell Clustering and Feedback for CoMP."

Kuawei, 3GPP TSG RAN WG1No.54, Aug. 18-Aug. 22, 2008, 2 Pages, "Inter-eNB and Intra-eNB Schemes for CoMP in LTE-Advanced."

Mobile Competence Centre 3GPP TSG RAN IMT Advanced Workshop Apr. 7-Apr. 8, 2008, 32 Pages, "LTE- IMT advanced—Candidate Technologies."

* cited by examiner

METHOD FOR TRANSMITTING COORDINATED MULTIPOINT TRANSMISSION/RECEPTION COORDINATED GROUP MESSAGES AND AN EVOLVED NODEB THEREOF

CROSS-REFERENCE TO RELATED APPLICATION

This application is the U.S. national phase of PCT Appin. No. PCT/CN2009/076135 filed Dec. 28, 2009 which claims priority to Chinese application 200910137312.6 filed Apr. 22, 2009, the disclosures of which are incorporated in their entirety by reference herein.

TECHNICAL FIELD

The present invention relates to the field of communication, and especially, to a method for transmitting coordinated multipoint transmission/reception coordinated group information and an evolved NodeB thereof.

BACKGROUND OF THE RELATED ART

The long term evolution (LTE) network consists of Evolved Node B (eNB) in the evolved universal mobile telecommunication system terrestrial radio access network (E-UTRAN) and Evolved Packet Core (EPC), and the network is flat. Wherein, the E-UTRAN comprises an eNB set connecting with the EPC via the S1 interface, and eNBs are connected with each other by X2, and the abovementioned S1 and X2 are logic interfaces.

One EPC might manage one or more eNBs, and one eNB can be controlled by several EPCs, and one eNB might manage one or more cells. The long-term evolution advance (LTE-A) system is evolved from the LTE system, and the network architecture of the LTE-A is the same as that of the LTE. New technologies such as relay, spectrum aggregation and coordinated multipoint transmission/reception (CoMP) are applied to the LTE-A to improve the system performance.

With the proposal of the LTE-A, more and more attention is paid to the cell average spectrum efficiency and the cell edge spectrum efficiency by people. Comparatively, the cell edge spectrum efficiency gains most attention, this is mainly because that the LTE-A system is a frequency division system whose uplink and downlink take the orthogonal frequency division multiplexing (OFDM) or its transformation as the basic multiple access multiplexing method, which is different from the conventional wireless communication system which takes the code division multiple access (CDMA) as the basic multiple access multiplexing method, and the LTE-A system has no processing gain, and there is nearly no interference issue since it is totally orthogonal frequency division within the cell, at the cell edge, however, the interference processing is relatively tough. Since the distances from users at the cell edge to the antennas in multiple adjacent cells are little different, it is most susceptible to interference, which affects the system performance. If different antennae in multiple cells can be utilized to simultaneously provide service for the users at the cell edge, not only the inter-cell interference can be avoided, but also the multiple antennae can be fully utilized to increase spatial dimension information, so that the capacity and performance of system are significantly improved. Therefore using the transmitting antennae in multiple cells to achieve relatively high capacity and reliable transmission of wireless links at the cell edge becomes a research emphasis.

When using different antennae in multiple cells to simultaneously provide service for the users at the cell edge, since there is a coordination relationship among the multiple cells (for example, it needs to decide what kind of resources are assigned to which users at what time), meanwhile, since the antennae in multiple cells serve one or more users at the same time, this transmission method is called Coordinated Multipoint Transmission/Reception (CoMP). The CoMP can obviously implement the inter-cell interference coordination and also achieve the reliable transmission of the wireless links or increase the capacity at the cell edge.

The original purpose of introducing the CoMP is to solve the problem of inter-cell interference in the OFDM system and to increase the UE throughput at the cell edge, for example, several eNBs coordinate to remove the interchannel interference (ICI), and even to change the interference signal into the expected signal. With further research, it finds out that applying the CoMP in the LTE-A can increase the data transmission speed, cell edge throughput, and/or system throughput, thus most companies have a very optimistic view of the CoMP technology.

Coordination among multiple eNBs can increase the cell edge throughput and the average cell throughput to a very large extent, it needs, however, very high backhaul capacity for sharing data/channel state information (CSI) among multiple eNBs, and the implementation is very complicated. In order to reduce the complexity, a limited number of eNBs/cells should be considered to coordinate to serve a special UE. Therefore, a problem related to the CoMP is how to select the coordinated cell cluster (simplified as CoMP coordinated group) to maximize the cell throughput, with acceptable scheduling complexity and the backhaul capacity. At present, the existing methods can be divided into the following three kinds:

(1) Network static CoMP coordinated group;
(2) UE dynamically selects the CoMP coordinated group;
(3) Mixed-mode CoMP coordinated group.

Wherein, for the mixed-mode CoMP coordinated group, the cell set providing service for a certain UE is one subset of one relatively large fixed cluster rather than the whole network.

The handover in the coordinated multipoint environment can be divided into the following three kinds:

(1) Handover within the coordinated group: the UE belongs to the same coordinated group before/after the handover, and the same coordinated group serves the UE before/after the handover.

(2) Handover between the coordinated groups: the UE belongs to the same coordinated group before/after the handover, but a part of nodes in the original coordinated group cannot cover the UE after the handover so that they cannot serve the UE coordinately, therefore, it needs to select a new coordinated group.

(3) Handover outside the coordinated groups: the service cell after the handover does not belong to the original coordinated group, and it needs to select a new coordinated group.

As shown in FIG. 1, according to the abovementioned three kinds of handover, the UE switching from location A to location B belongs to the first kind of handover; switching from location A to location C belongs to the second kind of handover; and switching from location A to location D belongs to the third kind of handover.

The CoMP coordinated group information is very useful information for selecting a suitable target handover cell during the handover in the coordinated multipoint environment. However, the network management system can be conventionally used to configure the CoMP coordinated group information for its managed eNBs and to send the CoMP coordinated group information to the eNBs, and this method for configuring the CoMP coordinated group information lacks flexibility and cannot adjust in real time according to the network condition.

SUMMARY OF THE INVENTION

The technical problem to be solved by the present invention is to provide a method for transmitting CoMP coordinated group information to share the CoMP coordinated group information among the eNBs to overcome the drawbacks in the prior art.

In order to solve the abovementioned problem, the present invention provides a method for transmitting coordinated multipoint transmission/reception (CoMP) coordinated group information, and the method comprises:

An eNB sends the CoMP coordinated group information of a CoMP coordinated group to which a local service cell belongs and/or the CoMP coordinated group information of a CoMP coordinated group to which a neighboring cell of the local service cell belongs to other eNBs via a X2 interface message.

In addition, the CoMP coordinated group information comprises: identification information of the CoMP coordinated group.

In addition, the identification information of the CoMP coordinated group comprises: a CoMP coordinated group ID, or the CoMP coordinated group ID and a public land mobile network ID.

In addition, the step of the eNB sending the CoMP coordinated group information to other eNBs via the X2 interface message comprises:

when establishing an X2 interface, the first eNB includes the CoMP coordinated group information in an X2 establishment request message and sends it to the second eNB; and when receiving the X2 establishment request message, said second eNB includes the CoMP coordinated group information in an X2 establishment response message and sends it to the first eNB.

In addition, the step of the eNB sending the CoMP coordinated group information to other eNBs via the X2 interface message comprises:

when configuration information of the first eNB changes, said first eNB includes the CoMP coordinated group information in an eNB configuration update message and sends it to the second eNB; and when receiving the eNB configuration update message, said second eNB includes the CoMP coordinated group information in an eNB configuration update acknowledgement message and sends it to the first eNB.

In addition, the step of the eNB sending the CoMP coordinated group information to other eNBs via the X2 interface message comprises:

when the CoMP coordinated group information of the first eNB changes, said first eNB includes the CoMP coordinated group information in a CoMP configuration update message and sends it to the second eNB; and when receiving the CoMP configuration update message, said second eNB includes the CoMP coordinated group information in a CoMP configuration update acknowledgement message and sends it to the first eNB.

The present invention also provides an eNB, and the eNB is configured with an X2 interface unit and a storage unit;

said storage unit is configured to store CoMP coordinated group information of a CoMP coordinated group to which a local service cell of the eNB belongs, and/or CoMP coordinated group information of a CoMP coordinated group to which a neighboring cell of the local service cell of the eNB belongs;

said X2 interface unit is configured to send the CoMP coordinated group information.

In addition, the CoMP coordinated group information comprises: identification information of the CoMP coordinated group.

The identification information of the CoMP coordinated group comprises: a CoMP coordinated group ID, or the CoMP coordinated group ID and a public land mobile network ID.

In addition, the X2 interface unit is configured to send said CoMP coordinated group information by following methods:

when establishing an X2 interface, sending the CoMP coordinated group information in an X2 establishment request message and/or an X2 establishment response message;

when configuration information of the eNB changes, sending the CoMP coordinated group information in an eNB configuration update message and/or an eNB configuration update acknowledgement message; and when the CoMP coordinated group information changes, sending the CoMP coordinated group information in a CoMP configuration update message and/or a CoMP configuration update acknowledgement message.

To sum up, the present invention uses the X2 interface message to send the CoMP coordinated group information to the neighboring eNB which uses the received CoMP coordinated group information for the handover judgment optimization, so that a handover judgment can fully use the received CoMP coordinated group information to select a suitable target cell for a terminal, thus to improve the CoMP transmission handover success rate of this network. Moreover, the CoMP coordinated group information can also be used to optimize the configuration of the CoMP coordinated group in the current network to improve the network performance.

PREFERRED EMBODIMENTS OF THE PRESENT INVENTION

The core idea of the present invention is: an eNB sends CoMP coordinated group information of the CoMP coordinated group to which the local service cell and/or the neighboring cell belongs to the other eNBs via an X2 interface message.

The present invention will be described in detail in combination with the accompanying figures and examples below.

THE FIRST EXAMPLE

Figure 1:
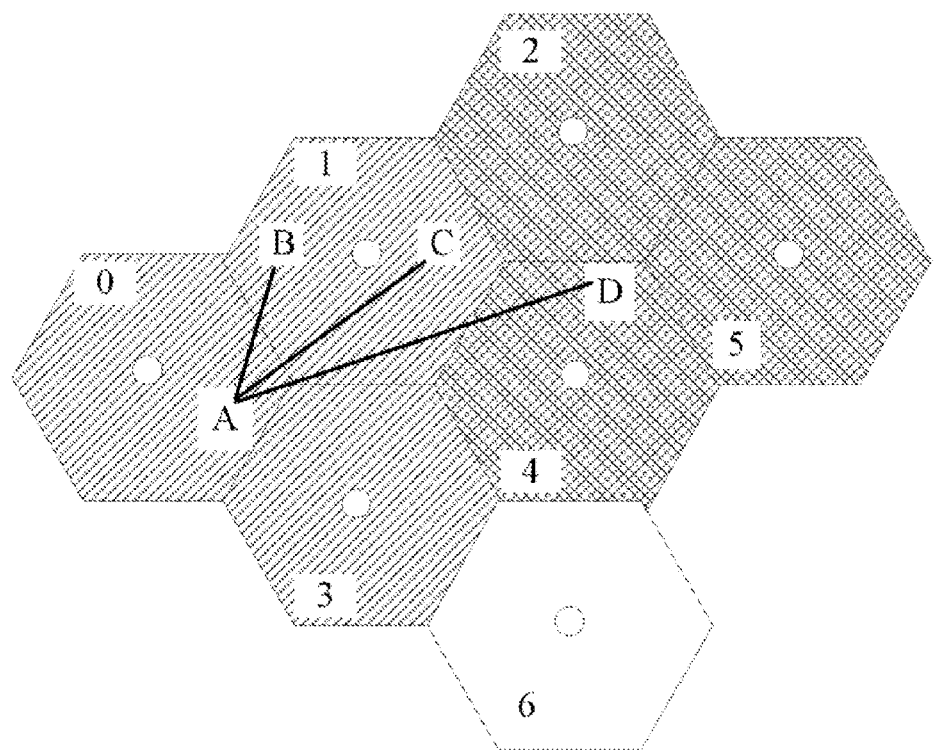
FIG. 1 is a schematic diagram of the handover in the coordinated multipoint environment.
Figure 2:
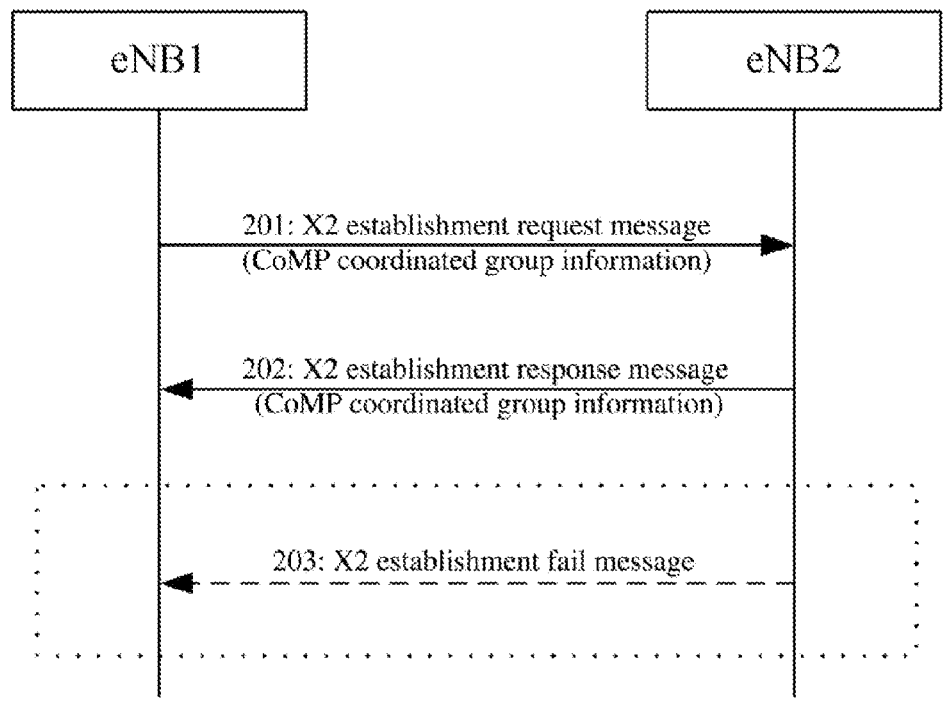
FIG. 2 is a flow chart of the method in accordance with the first example of the present invention.

FIG. 2 is a flow chart of the method in accordance with the first example of the present invention, and as shown in FIG. 2, the method comprises the following steps:

201: when the eNB1 establishes the X2 interface with the eNB2, the eNB1 sends a X2 establishment request message to the eNB2, and the message comprises the information of all service cells in the eNB1, and the information includes the CoMP coordinated group information of the CoMP coordinated group to which the service cells of eNB1 belong;

The CoMP coordinated group information comprises: the identification information of the CoMP coordinated group.

The identification information of the CoMP coordinated group can be: the CoMP coordinated group ID, or the CoMP coordinated group ID and the public land mobile network (PLMN) ID (as shown in Table 1) and so on.

TABLE 1

| Name | Meaning |
| --- | --- |
| PLMN ID | Including MCC and MNC |
| CoMP coordinated group ID | Unique in a certain range such as the PLMN |

Wherein, MCC is the abbreviation of mobile country code, and MNC is the abbreviation of mobile network code.

If a service cell belongs to a plurality of CoMP coordinated groups, the CoMP coordinated group information might comprise the IDs of a plurality of CoMP coordinated groups.

202: after the eNB2 receives the X2 establishment request message, if the X2 interface is established successfully, sends an X2 establishment response message to the eNB1, and the message includes the information of all service cells in the eNB2, and the information includes the CoMP coordinated group information of the CoMP coordinated group to which the service cells of the eNB2 belong; if the X2 interface fails to be established, proceed to step 203;

203: the eNB2 sends an X2 establishment fail message to the eNB1, and the message carries the failure reason.

THE SECOND EXAMPLE

Figure 3:
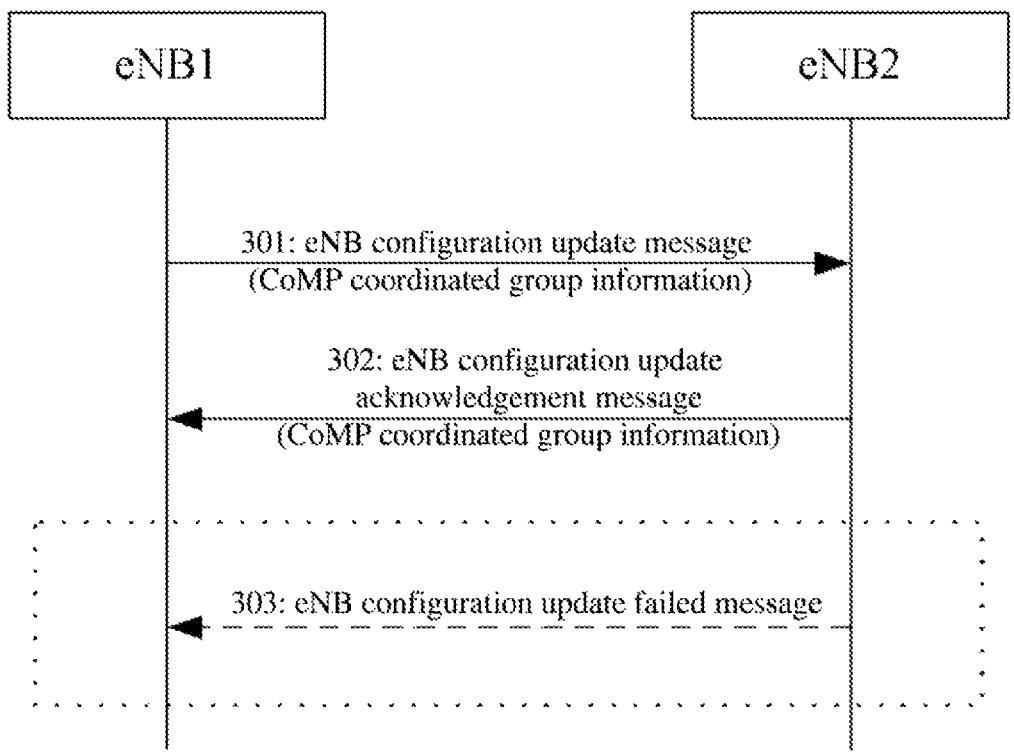
FIG. 3 is a flow chart of the method in accordance with the second example of the present invention.

FIG. 3 is a flow chart of the method in accordance with the second example of the present invention, and as shown in FIG. 3, the method comprises the following steps:

301: when the eNB configuration information changes (for example, the information of the service cell changes, the information of the neighboring cell of the service cell changes or the MME pool (mobile management entity pool) to which the eNB belongs changes), the eNB1 sends an eNB configuration update message to the eNB2, and the message comprises the information of all service cells in the eNB1, and the information includes the CoMP coordinated group information of the CoMP coordinated group to which the service cells belong.

302: after the eNB2 receives the eNB configuration update message, if the configuration update is successful, sends an eNB configuration update acknowledgement message to the eNB1; otherwise, proceed to step 303.

The abovementioned eNB configuration update acknowledgement message includes CoMP coordinated group information of the CoMP coordinated group to which the service cells of the eNB2 belong.

303: the eNB2 sends an eNB configuration update failed message to the eNB1, and the message carries the failure reason.

THE THIRD EXAMPLE

Figure 4:
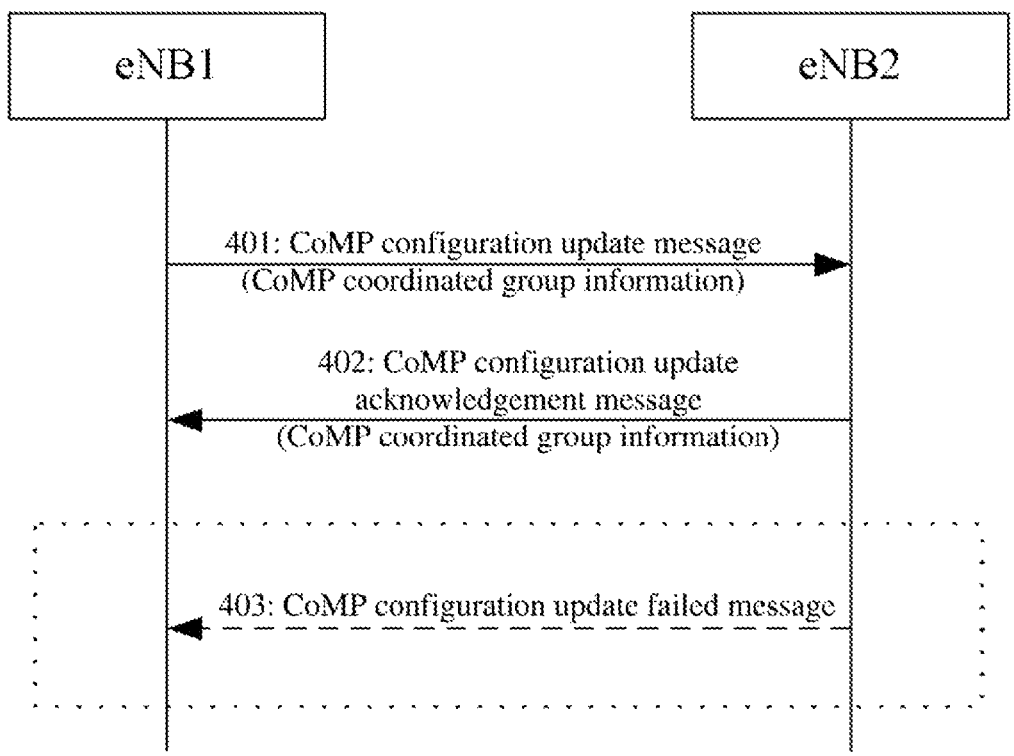
FIG. 4 is a flow chart of the method in accordance with the third example of the present invention.

FIG. 4 is a flow chart of the method in accordance with the third example of the present invention, and as shown in FIG. 4, the method comprises the following steps:

401: when the CoMP coordinated group information changes (for example, the ID of the CoMP coordinated group to which the service cells in the eNB belong changes), the eNB1 sends a CoMP configuration update message to the eNB2, and the message comprises the information of all service cells in the eNB1, and the information includes the CoMP coordinated group information of the CoMP coordinated group to which the service cells belong.

402: after the eNB2 receives the CoMP configuration update message, if the message is processed successfully, sends a CoMP configuration update acknowledgement message to the eNB1; otherwise, proceed to step 403.

The abovementioned CoMP configuration update acknowledgement message includes the CoMP coordinated group information of the CoMP coordinated group to which the service cells of the eNB2 belong.

403: the eNB2 sends a CoMP configuration update failed message to the eNB1, and the message carries the failure reason.

According to the basic principle of the present invention, the abovementioned examples might have many variations and expansion modes, for example:

(1) the eNB can also send the CoMP coordinated group information of the CoMP coordinated group to which the neighboring cell of the local service cell belongs to other eNBs, besides sending the CoMP coordinated group information of the CoMP coordinated group to which the local service cell belongs to other eNBs.

(2) the CoMP coordinated group information also includes other information of the CoMP coordinated group besides the identification information of the CoMP coordinated group.

Figure 5:
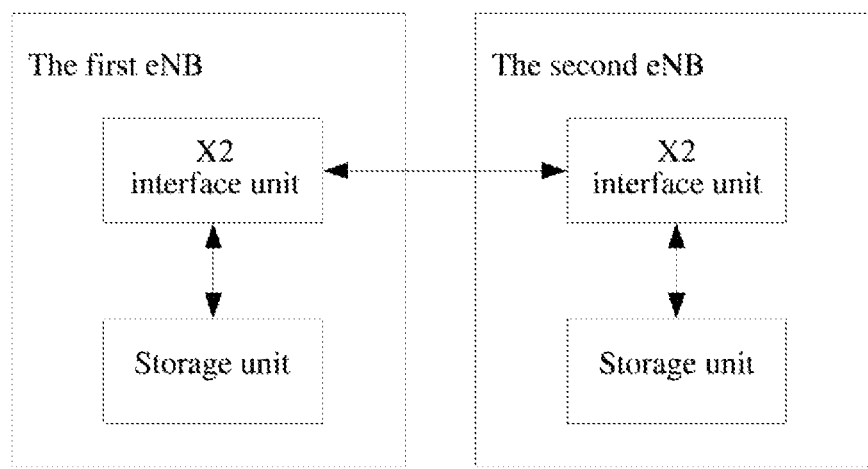
FIG. 5 is a schematic diagram of the structure of the eNB implementing the method for transmitting the CoMP coordinated group information in accordance with the present invention.

FIG. 5 is a schematic diagram of the structure of the eNB implementing the method for transmitting the CoMP coordinated group information in accordance with the present invention. As shown in FIG. 5, the eNB is configured with an X2 interface unit and a storage unit; wherein:

said storage unit is configured to store the CoMP coordinated group information of the CoMP coordinated group to which the local service cell of the eNB belongs, and/or the CoMP coordinated group information of the CoMP coordinated group to which the neighboring cell of the local service cell of the eNB belongs;

said X2 interface unit is configured to send the CoMP coordinated group information in the X2 establishment request message, and/or the X2 establishment response message, and/or the eNB configuration update message, and/or the eNB configuration update acknowledgement message, and/or the CoMP configuration update message, and/or the CoMP configuration update acknowledgement message.

The CoMP coordinated group information comprises: the identification information of the CoMP coordinated group.

The identification information of the CoMP coordinated group comprises: the CoMP coordinated group ID, or the CoMP coordinated group ID and the public land mobile network ID.

To sum up, the present invention uses the X2 interface message to send the CoMP coordinated group information to the neighboring eNB that stores the received CoMP coordinated group information locally after receiving it so as to be used afterwards.

For example, the neighboring eNB uses the received CoMP coordinated group information in the handover judgment optimization so that the handover judgment can fully use the received CoMP coordinated group information to select a suitable target cell for the terminal (for example, prefer to select the eNB in the same CoMP coordinated group as the target eNB), thus to improve the CoMP transmission handover success rate of the network. Moreover, the CoMP coordinated group information can also be used to optimize the configuration of the CoMP coordinated group in the existing network, so as to improve the network performance.

Industrial Applicability

Compared with the prior art, the present invention uses the X2 interface message to send the CoMP coordinated group information to the neighboring eNB which uses the received CoMP coordinated group information in the handover judgment optimization so that the handover judgment can fully use the received CoMP coordinated group information to select a suitable target cell for the terminal, thus to improve the CoMP transmission handover success rate of the network. Moreover, the CoMP coordinated group information can also be used to optimize the configuration of the CoMP coordinated group in the existing network to improve the network performance.

What is claimed is:

1. A method for transmitting coordinated multipoint transmission/reception (CoMP) coordinated group information, the method comprising:
   when a plurality of evolved node B (eNB) have been established, transmitting the CoMP coordinated group information between the plurality of evolved node B (eNB) via an X2 interface message;
   wherein the CoMP coordinated group information is at least one of the CoMP coordinated group information of a CoMP coordinated group to which a local service cell of the eNB belongs and CoMP coordinated group information of a CoMP coordinated group to which a neighboring cell of the local service cell of the eNB belongs; and
   wherein the CoMP coordinated group information comprises: a CoMP coordinated group ID, or the CoMP coordinated group ID and a public land mobile network ID;
   wherein, the step of the eNB sending the CoMP coordinated group information to other eNBs via the X2 interface message comprises:
   when the CoMP coordinated group information of a first eNB changes, said first eNB including the CoMP coordinated group information in a CoMP configuration update message and sending the CoMP configuration update message to a second eNB; and
   when receiving the CoMP configuration update message, said second eNB including the CoMP coordinated group information in a CoMP configuration update acknowledgement message and sending the CoMP configuration update acknowledgement message to the first eNB.

2. The method of claim 1, wherein,
   the step of the eNB sending the CoMP coordinated group information to other eNBs via the X2 interface message further comprises:
   when establishing an X2 interface, the first eNB including the CoMP coordinated group information in an X2 establishment request message and sending the X2 establishment request message to the second eNB; and
   when receiving the X2 establishment request message, said second eNB including the CoMP coordinated group information in an X2 establishment response message and sending the X2 establishment response message to the first eNB.

3. The method of claim 1, wherein,
   the step of the eNB sending the CoMP coordinated group information to other eNBs via the X2 interface message further comprises:
   when configuration information of the first eNB changes, said first eNB including the CoMP coordinated group information in an eNB configuration update message and sending the eNB configuration update message to the second eNB; and
   when receiving the eNB configuration update message, said second eNB including the CoMP coordinated group information in an eNB configuration update acknowledgement message and sending the eNB configuration update acknowledgement message to the first eNB.

4. An evolved node B (eNB), configured with an X2 interface unit and a storage unit; wherein,
   said storage unit is configured to store at least one of coordinated multipoint transmission/reception (CoMP) coordinated group information of a CoMP coordinated group to which a local service cell of the eNB belongs and CoMP coordinated group information of a CoMP coordinated group to which a neighboring cell of the local service cell of the eNB belongs;
   said X2 interface unit is configured to transmit the CoMP coordinated group information between a plurality of eNB established; and
   the CoMP coordinated group information comprises: a CoMP coordinated group ID, or the CoMP coordinated group ID and a public land mobile network ID;
   wherein, the X2 interface unit is configured to send said CoMP coordinated group information by any one of the following modes:
   when establishing an X2 interface, sending the CoMP coordinated group information in at least one of an X2 establishment request message and an X2 establishment response message;
   when configuration information of the eNB changes, sending the CoMP coordinated group information in at least one of an eNB configuration update message and an eNB configuration update acknowledgement message; and
   when the CoMP coordinated group information changes, sending the CoMP coordinated group information in at least one of a CoMP configuration update message and a CoMP configuration update acknowledgement message.

* * * * *